United States Patent [19]

Kanatani

[11] 4,366,504

[45] Dec. 28, 1982

[54] THIN-FILM EL IMAGE DISPLAY PANEL

[75] Inventor: Yoshiharu Kanatani, Tenri, Japan

[73] Assignee: Sharp Kabushiki Kaisha, Osaka, Japan

[21] Appl. No.: 154,370

[22] Filed: May 29, 1980

Related U.S. Application Data

[63] Continuation of Ser. No. 948,631, Oct. 3, 1978.

[30] Foreign Application Priority Data

| Oct. 7, 1977 | [JP] | Japan | 52-121214 |
| Oct. 7, 1977 | [JP] | Japan | 52-122085 |
| Jun. 7, 1978 | [JP] | Japan | 53-69656 |

[51] Int. Cl.³ .............................................. H04N 3/14
[52] U.S. Cl. ................................................... 358/241
[58] Field of Search ................................ 358/59, 241; 340/166 EL, 324 M

[56] References Cited

U.S. PATENT DOCUMENTS

| 3,021,387 | 2/1962 | Rschman | 358/59 |
| 3,293,356 | 12/1966 | Aiken | 358/59 |
| 3,752,910 | 8/1973 | Lewis | 358/59 |
| 3,765,011 | 10/1973 | Sawyer et al. | 358/241 |
| 4,234,821 | 11/1980 | Kako et al. | 358/241 |

*Primary Examiner*—Richard Murray
*Attorney, Agent, or Firm*—Birch, Stewart, Kolasch & Birch

[57] ABSTRACT

To obtain a half-tone display, the device disclosed employs a thin-film EL display panel and practices amplitude and pulse-width modulation wherein the amplitude and pulse-width of a pulse voltage applied to the thin-film EL display panel is varied according to video signals. In one preferred form thereof, a constant current amount or an enabling period of a constant current element provided within a discharge circuit is varied according to video signals, thereby controlling a pre-charge amplitude on the thin-film EL panel. The amount of discharging the pre-charge on the EL panel is under the control video signals. As a result, the brightness of the EL display panel corresponds to video signals.

22 Claims, 6 Drawing Figures

THIN-FILM EL IMAGE DISPLAY PANEL

This application is a continuation, of copending application Ser. No. 948,631, filed on Oct. 3, 1978.

BACKGROUND OF THE INVENTION

The present invention relates to an image display for displaying a half-tone image such as a television image through the utilization of a double-isolated thin-film display panel.

A prior art technique to obtain a half-tone image is to employ an analog-to-digital converter which provides a predetermined number of tone signals indicative of each of the sliced levels of video signals. This results in unnecessary complexity in circuit construction.

It is therefore an object of the present invention to provide a means for displaying a half-tone image such as a television image without using a analog-to-digital converter. To obtain a half-tone display, the present invention employs a thin-film EL display panel and practices amplitude modulation wherein the amplitude of a pulse voltage applied to the thin-film EL display panel is varied in accordance with video signals. In one preferred form thereof, a constant current amount or an enabling period of a constant current element provided within a discharge circuit is varied according to video signals, thereby controlling the pre-charge amplitude on the thin-film EL panel. The amount of the discharge of the pre-charge on the EL panel is controlled by the video signals.

As a result, the brightness of the EL display panel corresponds to video signals.

According to a television receiver embodying the present invention, video signals are stored for respective ones of the horizontal scanning electrodes during a single horizontal scanning slot of a television signal and the thin-film EL panel is charged in advance. In the presence of a horizontal synchronizing signal, the amplitude of the pre-charge on the thin-film EL panel is controlled by the thus stored video signals within a constant current discharge circuit constituted by a constant current element. A write voltage is applied to the thin-film EL panel during the first half of the next succeeding horizontal scanning slot and the pre-charge operation described above is carried out during the second half of that horizontal scanning slot.

BRIEF DESCRIPTION OF THE DRAWINGS

Other objects and many of the attendant advantages of the present invention will be readily appreciated as the same becomes better understood by reference to the following detailed description which should be considered in conjunction with the accompanying drawings, and wherein:

FIG. 4 is a time chart of respective mode steps of a write mode;

FIG. 6 is a time chart of a refresh mode.

DETAILED DESCRIPTION OF THE INVENTION

In order to better understand the present invention, a brief description will first be made with reference to FIG. 1, relating to construction of a double-isolated thin-film EL (electroluminescent) panel useful for the present invention.

Figure 1:
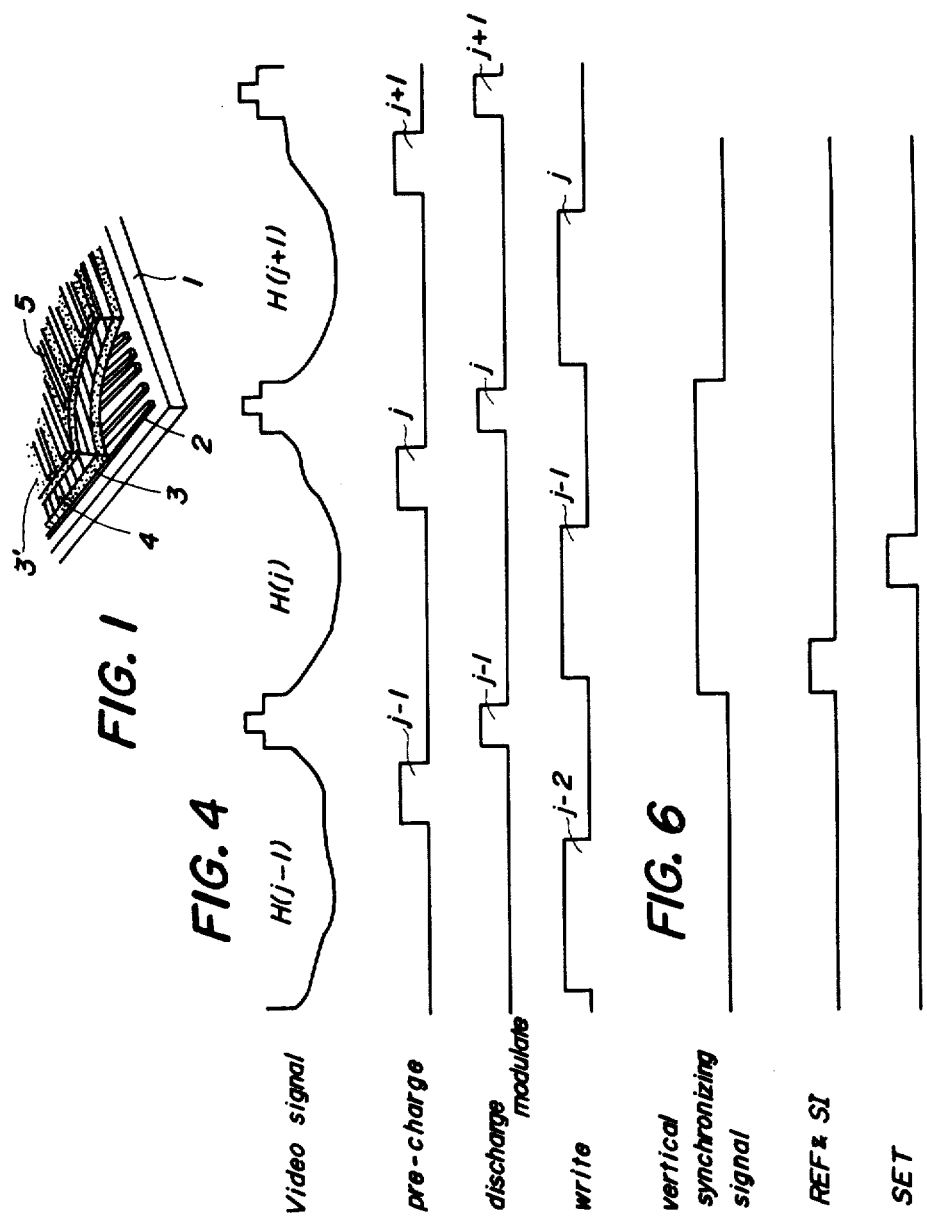
FIG. 1 is a fragmentary perspective view of a thin-film EL display panel.

As seen from FIG. 1, a thin-film EL display panel has a three-layered structure. A predetermined number of transparent electrode strips 2 are disposed on a glass support 1. Further, a layer 3 of dielectric material such as $Y_2O_3$, $SiN_4$, $TiO_2$ and $Al_2O_3$, a layer 4 of electroluminescent material, for example, ZnS doped with Mn (yellowish orange light) and a second layer 5 of dielectric material such as $Y_2O_3$, $SiN_4$, $TiO_2$, $Al_2O_3$ are disposed by a well known thin-film technique such as vacuum deposition and sputtering, each having a thickness ranging from 500 to 10000 Å. This results in a double-isolation three-layered structure of the EL display panel. A different family of strip electrodes 6 is disposed in a direction normal to the direction of the transparent electrodes 2 to form an electrode matrix array together with the transparent electrodes. With such three-layered thin-film EL display panel, if one of the first family 2 of the electrodes and one of the second family 6 of the electrodes are selected, the minute area where the selected ones of the electrodes cross or intersect will emit light. This corresponds to a picture element of an image like a character, a symbol and a pattern being displayed. The EL panel with such structure is more attractive than the prior art dispersed powder type EL panel from the standpoint of light intensity, working life and performance stability.

Figure 2:
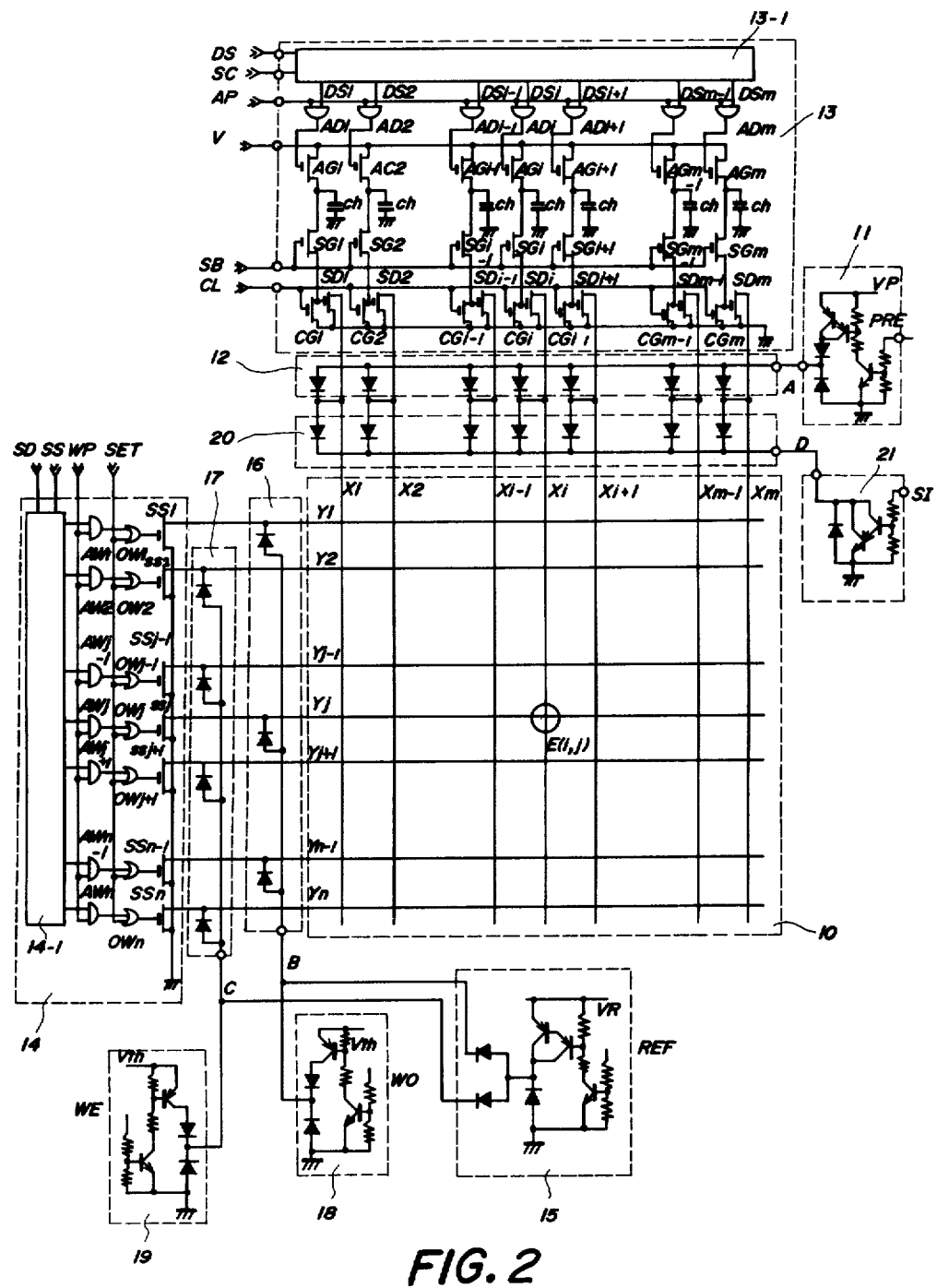
FIG. 2 is a circuit diagram of an EL panel drive circuit construction embodying the present invention.
Figure 3:
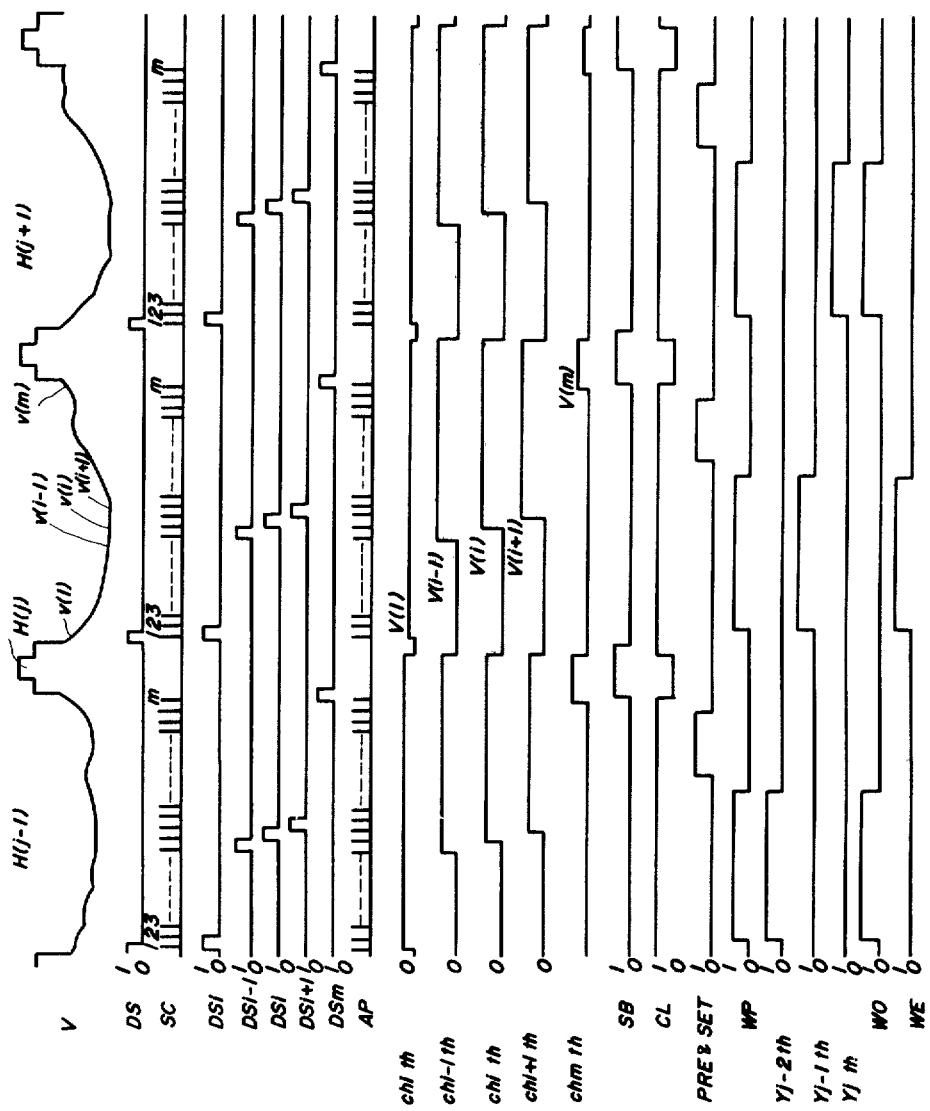
FIG. 3 is a time chart of the circuit of FIG. 2.
Figure 5:
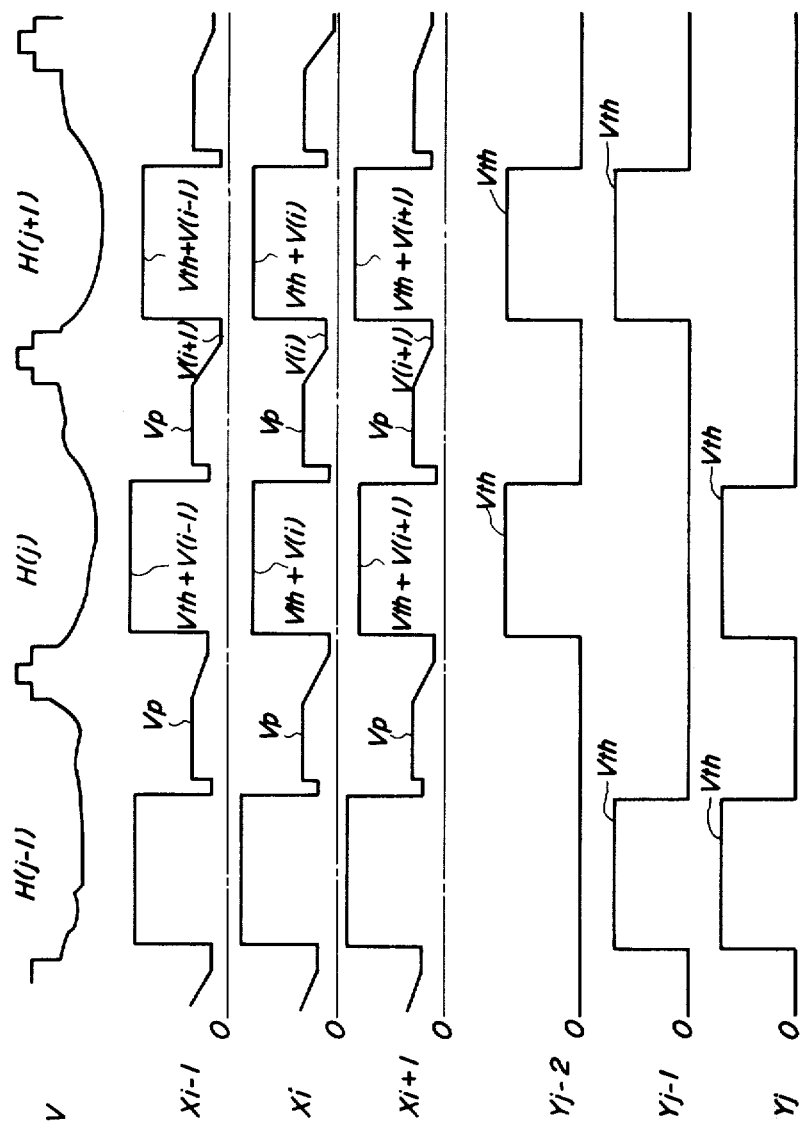
FIG. 5 is a waveform diagram of voltages appearing on respective enable lines.

A preferred form of the present invention is adapted to display a television image on the above mentioned double-isolated matrix thin-film EL display panel. FIGS. 2 and 3 are circuit diagrams and a time chart of the preferred form and FIG. 5 shows the relationship between the voltage applied to a specific electrode and a video signal.

In FIG. 2, the above described thin-film EL display panel is labeled 10 wherein electrodes $X_1$-$X_m$ in the X direction serve as data electrodes and electrodes $Y_1$-$Y_n$ in the Y direction serve as scanning electrodes. Only these electrodes of the thin-film EL display panel are depicted in the drawings. An enable circuit 11 supplies a pre-charge voltage $V_p$ to a common line A in response to a precharge signal PRE. A diode array at the data side is labeled 12 wherein the respective ones of the diodes are connected to the common line A at the anodes thereof and to the respective electrodes $X_1$-$X_m$ at the cathodes thereof. The effects of the diode array 12 are to provide isolation for respective data lines and protect switching elements consisting of high voltage transistors from being reverse biased.

A modulator circuit 13 includes logic circuit elements and output circuit elements and may be implemented with an integrated circuit technique. This circuit particularly includes a shift data signal DS which is derived from a signal synchronous with a horizontal synchronizing signal contained within a television composite signal and derived through a conventional modulator circuit, a digital shift register 13-1 which performs shift operation in response to a shift clock signal SC, AND logic circuits $AD_1$-$AD_m$ which produce a logic product of shift pulses $DS_1$-$DS_m$ developing at the output of the digital shift register 13-1 and a sampling operture signal AP determining a sampling period, analog gates AG$_1$-AG$_m$ which gate video signals (analog signals) received and picked up through a conventional demodulator circuit according to the outputs of the AND logic gates AD$_1$-AD$_m$, a family of capacitors Ch storing as a charge amplitude the video signal V after passing over the analog gates AG$_1$-AG$_m$, analog gates SG$_1$-SG$_m$ which are opened by strobe signals SB synchronous with the horizontal synchronizing signal, ON/OFF switching elements CG$_1$-CG$_m$ which are held in the ON state in response to a clear signal CL in order to ensure the OFF state of constant current element SD$_1$-SD$_m$ to be described later with respect to the pre-charge mode, and the constant current type drive elements (for example, an N channel DSAMOS diffusion self alignment metal oxide semiconductor transistor) SD$_1$-SD$_m$ which vary the pre-charge amplitude on the thin-film EL display panel according to the video signals and form a constant current charging circuit.

A scanning switch element circuit 14 is connected to the scanning electrodes Y$_1$-Y$_n$, which comprises a digital shift register 14-1 performing shift operation in response to a shift data signal SD produced from a signal synchronous with the horizontal synchronizing signal and a shift clock signal SS, AND logic circuits AW$_1$-AW$_n$ which produce logic products of the outputs of the digital shift register 14-1 and the write signal WP, OR logic circuits WO$_1$-OW$_n$ which produce logic sums of the outputs of the AND logic circuits AW$_1$-AW$_n$ and a set signal SET, and N channel DSAMOS transistors enabled with the outputs of the OR logic circuits OW$_1$-OW$_n$. This circuit arrangement can be implemented with an integrated circuit technique.

A diode array 16 is provided with the respective cathodes thereof connected to odd scanning drive lines and the respective anodes thereof connected in common, for the purpose of isolating the scanning drive lines from one another and preventing those switching elements from being reverse biased.

Another diode array 17 is provided with the respective cathodes thereof connected to even scanning drive lines and the respective anodes thereof connected in common for the same purpose.

A drive circuit 18 supplies the odd scanning drive lines with a voltage V$_{th}$ in response to the write signal WO. Another drive circuit 19 supplies the even scanning drive lines with the same voltage V$_{th}$ in response to the write signal WE. The supply voltage from the write drive circuits 18, 19 may be lower than a threshold voltage level of electroluminescence of the thin-film EL display panel and in this instance it is necessary to raise the voltage of the drive circuits by such a voltage differential. In the inventor's experiments the voltage V$_P$ was 70 V and the voltage V$_{th}$ was 140 V.

A diode array 20 has a plurality of diodes with the anodes connected to the data electrodes and the cathodes connected in common, which supplies a refresh pulse.

A refresh drive circuit 15 supplies a refresh pulse voltage Vr to the common lines B, C of the diode arraies 16, 17 simultaneously upon a signal REF. A circuit 21 forms a sink circuit upon a signal SI during the refresh mode.

By reference to a flow chart of FIG. 3, the mode of operation where a specific scanning line j is driven will be now described.

At the beginning of the video signal period as to the scanning electrode Y$_j$ the shift data pulse DS is applied to the digital shift register 13-1 which is sequentially shifted in response to the shift clock signal SC to produce the shift data pulses DS$_1$-DS$_m$. The AND logic circuits AD$_1$-AD$_m$ produce logic products of the data pulses DS$_1$-DS$_m$ and the sampling period determining sample operture signals and supply them in sequence to the analog gates AG$_1$-AG$_m$. Since the analog gates AG$_1$-AG$_m$ are supplied on the input lines thereof with the outputs of the AND logic circuits AD$_1$-AD$_m$ and on the common lines thereof with the video signal V, the video signal passes the analog gates AG$_1$-AG$_m$ only during the period of the sample aperture signal. At that time the hold capacitors Ch leading the outputs of the analog gates AG$_1$-AG$_m$ are charged with the amplitude (voltage) of the respective video signals. In this way, the respective capacitors Ch associated with the data electrodes X$_1$-X$_m$ hold the corresponding video signal amplitudes.

[PRE-CHARGE]

Immediately before the video signal period is completed, in other words, while the video signal is being sampled, the pre-charge signal PRE is generated to urge the drive circuit 11 into the operative state. Under the circumstance the gates to all the scanning side switching elements SS$_1$-SS$_n$ are supplied with the set signal SET via the OR logic circuits OW$_1$-OW$_n$, placing all the switching elements into the ON state. All of the drive transistors SD$_1$-SD$_m$ within the data side switching element circuit 13, on the other hand, are present in the OFF state. The transistors SD$_1$-SD$_m$ in the OFF state are definitely guaranteed to be off by placing all the clear gates CG$_1$-CG$_m$ into the ON state in response to the clear gate pulse CL. It will be noted that the clear gate pulse CL completely covers the pulse period of the pre-charge signal PRE and that of the set signal SET. Since the drive circuit 11 is supplied on the common line A with the voltage V$_p$, all the picture elements on the thin-film EL display panel are charged with the voltage V$_p$ via the all the data lines X$_1$-X$_m$. The voltage V$_p$ is correlated as V$_p$=V$_w$-V$_{th}$ wherein V$_w$ is the electroluminescent voltage of the thin-film EL display panel and V$_{th}$ is the threshold voltage V$_{th}$ thereof.

[DISCHARGE MODULATION]

After the m th sampling of the video signal is executed by the action of the digital shift register 13-1 and the pre-charge is completed in advance to the blanking period, the strobe pulse signal SB is applied to all the analog gates SG$_1$-SG$_m$ and supply of the clear pulse CL is discontinued. The instantaneous amplitudes (voltage) of the video signals stored on the respective hold capacitors Ch are released to the gates of the constant current drive elements SD$_1$-SD$_m$ at once. The set pulse signal SET is discontinued as soon as the pre-charge mode is completed. Thus all the transistors SS$_1$-SS$_n$ within the scanning side switching circuit 14 are rendered inoperative.

When the video signals stored on the capacitors are impressed upon the constant current type drive elements SD$_1$-SD$_m$, discharge modulation mode is carried out across the pre-charge in a constant current fashion for each of the discharge periods.

The discharge current "id" flowing through the output of a specific transistor SD$_i$ can be represented below:

$$id = -C(dv/dt) \qquad (1)$$

wherein C is a sum of capacitances of respective lines viewed from the modulation side drive lines $X_1$-$X_m$ and is equal to C=nCe (Ce: capacitance per picture element of the matrix panel and n: the number of all the picture elements).

Since the transistors $SD_1$-$SD_m$ are of the constant current type, the discharge voltage V per unit period can be written below:

$$V = \int_o^T -\frac{id}{C} dt = V_p - \frac{id}{C} \tau \qquad (2)$$

wherein $\rho$ is the discharge period.

Assume now that an N channel MOS transistor having the relationship between the input gate voltage $V_g$ and the drain current id as defined below is employed as a constituent element in the modulation side drive circuit 13:

$$iD = gmVg \qquad (3)$$

wherein gm is the gate-to-drain mutual conductance of the transistor employed and a proportional constant.

Where Vg(i) is the input gate voltage of the constant current type drive element SDi driving a specific drive line Xi connected to the modulation side drive circuit 13 and gm(i) is the mutual conductance thereof, the voltage V(i) of the drive line Xi following application of the voltage Vg(i) to the gate of that transistor SDi will be rewritten from the foregoing formulas (1) and (2):

$$V(i) = V_p - \frac{id}{C} \tau = V_p - \frac{iD}{C} \tau \qquad (4)$$

$$= V_p - \frac{gm(i)}{C} \cdot V_g(i)\tau$$

wherein iD is the drain current and is equal to the discharge current iD.

In as much as the mutual conductance gm of the elements $SD_1$-$SD_m$ in the circuit 13 is much less different from element to element, $gm(i) \approx gm(K \neq i) = gm$ is satisfied and gm/C is deemed as the constant K. The formula (4) can be rewritten as the following one (5):

$$V(i) = V_p - K \cdot V_g(i) \cdot \tau \qquad (51)$$

The formula (5) reveals that the input gate voltage $V_g(i)$ of the drive element SDi and the period $\tau$ of the input gate voltage applied are two parameters of determining the voltage V(i).

Accordingly, a way to provide a visual display of a half-tone image by the amplitude modulation for the thin-film EL display panel consists either applying a signal having the variable amplitude corresponding to the video signal for a specific period to the input of the constant current type drive element or applying a signal having the fixed voltage amplitude but the variable pulse width corresponding to the video signal to the input of the constant current type drive element. The former is named the amplitude modulation drive method by the amplitude modulated input signal and the latter is named the amplitude modulation drive method by the pulse width-modulated input signal. The amplitude modulation drive method by the amplitude-modulated input signal is executed such that a signal variable in voltage according to the video signal is applied to the gate of the transistor SDi. The amplitude modulation drive method by the pulse width-modulated input signal is executed through the utilization of a signal variable in pulse width according to the video signal, which pulse width variable signal is applied to the transistor SDi.

One preferred form of the present invention is adapted to charge previously a picture element to be written with a voltage corresponding to the magnitude of the video signal.

[WRITE MODE]

In order to write the respective picture elements E(1, j), E(2, j), ... E(i, j), ... E(m, j) on the scanning side electrode Yj during the next succeeding video signal period, all the transistors $SS_1$-$SS_n$ in the scanning side switch circuit 14 and all the transistors $SD_1$-$SD_m$ in the data side switch circuit 13 should assume the OFF state. Under the circumstance the modulation side drive electrodes $X_1$-$S_m$ are held or clamped with the voltages V(i), (i=1,2, ... m) corresponding to the inputs to the modulation side elements $SD_1$-$SD_m$.

Only the transistor $SS_j$ enabling a selected one of the scanning electrodes Yj is turned ON in response to the output from the digital shift register 14-1, while all the remaining scanning drive elements $SS_{k \neq j}$ still stand in the OFF state. If the scan electrode Yj is odd at this moment, then the write drive circuit 19 upon application of the write command WP will bring the common line C of the diode array 17 connected to the even scan electrodes up to the electroluminescence threshold voltage Vth. Since the drive elements $SD_1$-$SD_m$ and $SS_1$-$SS_n$ connected to the driven lines $X_1$-$X_m$ and $Y_1$-$Y_n$ are all in the OFF state at this moment, all the scanning side drive lines are raised up to the voltage $V_{th}$ due to the capacitive coupling between the modulation side drive lines $X_1$-$X_m$ and the scanning side drive lines $Y_1$-$Y_n$. The voltages $V_w(i)$, (i=1,2, ... m) of the modulation side electrodes $X_1$-$X_m$ are below the voltages on the threshold since the write mode is carried out so as to increase all the scanning side electrodes $Y_{k \neq j}$ except the selected scan electrode Yj up to the electroluminescence threshold voltage $V_{th}$:

$$V_w(i) = V(i) + V_{th} \qquad (6)$$

The transistor associated with the selected scan electrode Yj is in the ON state so that the picture element (i, j) on the selected scan electrode Yj causes electroluminescence in proportion to the write voltage $V_{w(i)}$ in response to the supply of the voltage as defined by the formula (6). Meanwhile, the voltage V(i) is supplied to the picture elements E(i, k≠j) on the non-selected scan electrodes $Y_{k \neq j}$.

In order that the selected picture element on the selected scan electrode Yj causes electroluminescence and the non-selected picture elements on the non-selected scan electrodes $Y_{k \neq j}$ do not cause electroluminescence, the respective voltages of the common line drive circuits 11, 18, 19 should be correlated as follow. In the given example, $V_p = \frac{1}{3} V_{th}$.

$$V(i) \leq V_p \leq V_{th} \leq V_w(i) \qquad (7)$$

The picture element on the selected scan electrode Yj is written in this way.

When it is desired to write the picture element on the even scan line $Y_{j+i}$ during the write mode, the write drive circuit 18 drives the common line B of the diode array 16 connected to the odd scanning lines to drive these lines up to the electroluminescence threshold voltage $V_{th}$ and only the drive element $SS_{j+1}$ in the scanning side drive circuit is placed into the ON state during the period of the write command WP.

The pulse width of the write command WP is approximately one half as long as the video signal period. During the write mode the write voltage is supplied for a long moment to avoid the influence of variations in line resistance of the drive lines.

The clear pulse CL is also supplied to the clear gates $CG_1$-$CG_m$ during this period, which gates are held in the ON state to make sure the constant current drive elements $SD_1$-$SD_m$ are held in the OFF state. The clear gates $CG_1$-$CG_m$ are in the OFF state only when the strobe signal SB is supplied during the blanking period and the constant current type elements $SD_1$-$SD_m$ effect the discharge modulation mode on the basis of constant current. Why the clear pulse CL is applied during the whole period except for the blanking period is that the thin-film EL display panel is a relatively high voltage element and the gate inputs of the constant current type drive elements are grounded with a low impedance by the clear gates $CG_1$-$CG_m$ to avoid the adverse effects of feedback upon the input side thereof whereby drive noise may ride on the instantaneous amplitude of the video signal held on the hold capacitor Ch during the sampling period or the operation of the drive elements may lack stability.

In this manner, the video signal is written on the scanning drive line Yj while the video signal of the next succeeding scanning drive line $Y_{j+1}$ is being sampled. During the write mode, the modulation side drive circuit 13 samples the video signal for the next scanning drive line $Y_{j+1}$. The pre-charge mode is executed after completing the write mode but before the next succeeding blanking period.

As noted above, pursuant to the teachings of the present invention, the video signal for the write mode is effected for the scanning side drive line $Y_{j+1}$ and the pre-charge mode is effected for the scanning side drive line Yj while the scanning side drive line Yj is being sampled. The discharge modulation mode is effected upon the scanning side drive line Yj during the blanking period of the scanning side drive line Yj. The drive method embodying the present invention, therefore, generally consists of the pre-charge mode, the discharge modulation mode and the write mode.

FIG. 4 shows the timing relationship among the pre-charge mode, the discharge modulation mode and the write mode. With regard to the video signal V. FIG. 5 shows the video signal V, and the drive waveforms for the modulation side drive lines $X_{i+1}$, $X_i$ and $X_{i-1}$ and the scanning side drive lines $Y_{j-2}$, $Y_{j-1}$ and Yj.

The above mentioned operational modes are repeated to write sequentially the scanning side drive lines 1, 2, 3, ... n. After completing one-field scan, a refresh mode is effected during the blanking period of the vertical synchronizing signal. The refresh mode is effected through a combination of the drive circuit 15, the diode arrays 16, 17, 20 and the drive circuit 21.

During that period the transistors $SS_1$-$SS_n$ within the scanning side switching circuit 14 are all in the OFF state and the counterparts $SD_1$-$SD_m$ within the data side switching circuit 13 are all in the OFF state. The drive pulses REF and SI are supplied to the inputs of the circuits 15, 21 simultaneously and the refresh pulse is applied throughout the EL panel. The refresh pulse voltage Vr is equal to the write voltage applied to the respective scan electrodes to cause the maximum brightness. The refresh pulse Vr is reversed in polarity when applied to the thin-film EL display panel. Therefore, the thin-film EL display panel is driven with the write voltage and the refresh pulse voltage alternatively, with respect to each other. If the write pulse is first applied to cause polarization on the picture element and then the refresh pulse is applied, the refresh pulse is superimposed upon a polarization electric field, allowing only the picture elements already written to cause electroluminescence. Since the degree of polarization of the picture elements already written in proportional to the electroluminescence brightness, the electroluminescence corresponding to the polarization degree is available upon application of the refresh pulses, thereby enabling a half-tone display. The effects of the refresh pulses are to prevent polarization from being biased in a certain direction and permit the already written picture elements to cause electroluminescence upon the write voltage during the next succeeding field period.

At the final stage of the refresh mode the set input signal SET is applied to the circuit 14 to turn ON the transistors $SS_1$-$SS_n$ to unload the charge of the refresh voltage Vr from the panel which has accumulated on the whole of the panel.

The vertical synchronizing signal and the various control signals REF, SI and SET used in the refresh mode are correlated in the timing relationship viewed from FIG. 6. The write mode and the refresh mode described above will be repeated to complete a display of a television image.

The invention being thus described, it will be obvious that the same may be varied in many ways. Such modifications are not to be regarded as a departure from the spirit and scope of the invention, and all such modifications are intended to be included within the scope of the following claims.

I claim:

1. An electroluminescent video display means including an electroluminescent video display panel and means for driving said video display panel in response to a received video signal, said video display panel including a plurality of scanning side electrodes and a plurality of data side electrodes, said means for driving said video display panel comprising:

means associated with said data side electrodes for sampling said received video signal thereby producing a plurality of sampled amplitude modulated video information pulses;

means associated with said data side electrodes for storing each of said plurality sampled amplitude modulated video information pulses;

pulse generating means associated with each of said plurality of data side electrodes for energizing each of said data side electrodes with a voltage pulse, each of said plurality of sampled amplitude modulated video information pulses stored in said means for storing amplitude modulating the voltage pulses to energize the data side electrodes each amplitude modulated voltage pulse energizing said corresponding one of the data side electrodes;

write circuit means for supplying a write voltage pulse to a selected one of said scanning side electrodes, said write voltage pulse being supplied to each of said scanning side electrodes in a line sequential scanning manner; and refresh circuit means responsive to the completion of the scanning of said scanning side electrodes by said write circuit means for supplying refresh voltage pulses to each of said scanning side electrodes, said refresh voltage pulses having a polarity opposite to the polarity of said write voltage pulse.

2. The electroluminescent video display means in accordance with claim 1 wherein:
said means for storing comprises a plurality of capacitor means connected to each of said data side electrodes for storing said plurality of sampled amplitude modulated video information pulses.

3. The electroluminescent video display means in accordance with claim 1 wherein the amplitude modulated voltage pulse energizing said corresponding one of the data side electrodes is superimposed onto said write voltage pulse energizing said selected one of said scanning side electrodes at a selected picture point defined by the intersection between said corresponding one of said data side electrodes and said selected one of said scanning side electrodes thereby creating a superimposed given voltage at said selected picture point.

4. The electroluminescent video display means in accordance with claim 3 wherein electroluminescence is produced at said selected picture point when said superimposed given voltage at said selected picture point is greater than a predetermined threshold level of electroluminescence for said selected picture point.

5. A video display device for displaying image information in response to a received video signal, comprising:
thin film EL display panel means having a plurality of scanning side electrodes and a plurality of data side electrodes;
scanning side selection circuit means provided for said scanning side electrodes of said thin film EL display panel;
data side selection circuit means provided for said data side electrodes of said thin film EL display panel;
pre-charge circuit means for charging a selected one of the data side electrodes inclusive of a picture element to be written, said pre-charge circuit means charging the selected data side electrode to a voltage corresponding to said received video signal;
write circuit means for supplying a write voltage to a selected one of the scanning side electrodes inclusive of the picture element to be written; and
said precharge circuit means including a discharge modulation circuit means, said discharge modulation circuit means including,
means for sampling said received video signal thereby providing a plurality of sampled video information signals,
a plurality of storage means corresponding to each of said plurality of data side electrodes for storing said plurality of sampled video information signals therein, and
pulse generating means connected to each of said data side electrodes for energizing each of said plurality of data side electrodes with a voltage pulse, each of said plurality of sampled video information signals stored in said storage means pulse-width modulating said voltage pulse when said voltage pulse energizes a corresponding one of said data side electrodes inclusive of said picture element to be written.

6. The video display device of claim 5, wherein said pre-charge circuit means further comprises a voltage supply circuit means for supplying a voltage to said EL display panel sufficient to cause electroluminescence at a maximum brightness level.

7. The video display device of claim 6, wherein said discharge modulation circuit means further comprises a constant current element means, the input of said constant current element means is energized by said pulse-width modulated voltage pulse thereby allowing said pulse-width modulated voltage pulse to energize said corresponding data side electrode.

8. A video display device comprising:
a thin film EL display panel having a thin film EL layer sandwiched by a pair of thin film dielectric films and a matrix electrode pattern;
a plurality of scanning drive lines connected to said matrix electrode pattern;
firm means for sampling a video signal for a specific scanning drive line $Y_j$ during a video signal period;
second means for executing a write mode upon the preceding scanning drive line $Y_{j-1}$;
third means for executing a pre-charge mode for the specific scanning drive line $Y_j$; and
fourth means for executing a discharge modulation mode for the specific scanning drive line $Y_j$ during a horizontal blanking period, thereby providing a visual display of a video image.

9. A video display device comprising:
a thin film EL display panel having a thin film EL layer sandwiched by a pair of thin film dielectric films and a matrix electrode pattern;
a plurality of scanning drive lines connected to said matrix electrode pattern;
firm means for sampling a video signal for a specific scanning drive line $Y_j$ during a video signal period;
second means for executing a write mode upon the preceding scanning drive line $Y_{j-1}$;
third means for executing a pre-charge mode for the specific scanning drive line $Y_j$ and
fourth means for executing a discharge modulation mode for the specific scanning drive line $Y_j$ during a horizontal blanking period; and
fifth means for executing a refresh mode during a vertical blanking period, thereby providing a visual display of a video image.

10. A video display device for displaying image information in response to a received video signal, comprising:
a thin film electroluminescent display panel having a plurality of scanning electrodes disposed on one side of said panel and a plurality of data electrodes disposed on the other side of said panel;
first means connected to each of said data electrodes for preliminarily charging said data electrodes and for applying a potential across said display panel at a voltage below the threshold of electroluminescence;
second means connected to each of said scanning electrodes and responsive to the completion of the charging by said first means for charging said scanning electrodes and for increasing the potential across said display panel to a voltage below and substantially near the threshold of electroluminescence of said panel; and
third means responsive to the completion of the charging of said display panel by said first means for generating a plurality of voltage pulses and for energizing each of said data electrodes with said voltage pulses when said second means charges said scanning electrodes, each of said voltage pulses having a pulse-width which varies in accordance with said received video signal.

11. A video display device in accordance with claim 10 wherein said third means comprises:
  means for sampling said received video signal and developing a plurality of sampled video information signals;
  storage means associated with each of said data electrodes for storing said plurality of sampled video signals; and
  means associated with each of said data electrodes for strobing each of said data electrodes with voltage pulses, each of said sampled video information signals stored in said storage means modulating each of the corresponding voltage pulses by changing the pulse-width of said voltage pulses, the modulated voltage pulses energizing said display panel via said data electrodes.

12. A circuit arrangement for driving a matrix type video display device in a line scanning fashion in accordance with a received video signal, comprising:
  a thin-film EL display panel having a predetermined number of scanning side electrodes and a predetermined number of data side electrodes thereby defining a plurality of picture elements through said panel;
  pre-charge circuit means connected to said data side electrodes for preliminarily charging said thin-film EL display panel to a given voltage via said data side electrodes, said given voltage being lower than the threshold of electroluminescence;
  means for selecting one of said data side electrodes and one of said scanning side electrodes to define one of said picture elements to be written, the remaining data said electrodes being non-selected data side electrodes, the intersection between the non-selected data side electrodes and the selected scanning side electrode defining non-selected picture elements;
  discharge modulation circuit means for allowing said given voltage on said non-selected data side electrodes to discharge to ground, the amplitude of the given voltage of said selected data side electrodes corresponding to said received video signal; and
  write circuit means for scanning the selected scanning side electrodes by supplying a write voltage to said thin-film EL display panel via the selected scanning side electrode, said write voltage being superimposed on said given voltage at said one of said picture elements to be written creating a superimposed given voltage at said one of said picture element to be written, said superimposed given voltage being higher than said threshold of electroluminescence thereby enabling said one of said picture elements to be written, the voltage at each of said non-selected picture elements being lower than the threshold of electroluminescence and being insufficient to enable said non-selected picture element, whereby a desired video image is displayed on said thin-film EL display panel.

13. A circuit arrangement for driving a matrix type video display device in accordance with claim 12 wherein said circuit arrangement further comprises:
  refresh circuit means responsive to the completion of said scanning of said selected scanning side electrodes by said write circuit means for supplying refresh voltage pulses to said scanning side electrodes of said thin-film EL display panel, said refresh voltage pulses having a polarity opposite to the polarity of said write voltage.

14. A video display device for displaying image information in response to a received video signal, comprising:
  thin film electroluminescent display panel means having a plurality of a first set of electrodes and a plurality of a second set of electrodes;
  first circuit means for selecting one of said first set of electrodes and supplying a write voltage to said one of said first set of electrodes;
  second circuit means for selecting one of said second set of electrodes and supplying a further voltage to said one of said second set of electrodes; and
  pre-charge circuit means associated with said second set of electrodes for preliminarily charging each of said second set of electrodes to a voltage below the threshold level of electroluminescence of said display device prior to the supplying of said write voltage to said one of said first set of electrodes and said further voltage to said one of said second set of electrodes.

15. A video display device in accordance with claim 14 wherein said further voltage comprises a modulated voltage;
  said second circuit means includes discharge modulation circuit means for supplying said modulated voltage to said one of said second set of electrodes.

16. A video display device in accordance with claim 15 wherein said discharge modulation circuit means comprises:
  means for sampling said received video signal thereby providing a plurality of sampled video information signals;
  a plurality of storage means corresponding to each of said plurality of a second set of electrodes for storing each of said plurality of sampled video information signals therein, each of said plurality of sampled video information signals being stored in a corresponding one of said plurality of storage means, and
  pulse generating means connected to each of said second set of electrodes for energizing each of said plurality of a second set of electrodes with a voltage pulse, each of said plurality of sampled video information signals stored in said storage means modulating said voltage pulse when said voltage pulse energizes said second set of electrodes, the modulated voltage pulse energizing said second set of electrodes.

17. A video display device in accordance with claim 16 wherein each of said sampled video information signals amplitude modulates said voltage pulse when said voltage pulse energizes said second set of electrodes.

18. A video display device in accordance with claim 16 wherein each of said sampled video information signals pulse-width modulates said voltage pulse when said voltage pulse energizes said second set of electrodes.

19. A video display device for displaying image information in response to a received video signal, comprising:

thin-film electroluminescent display panel means having a plurality of a first set of electrodes and a plurality of a second set of electrodes;

means for preliminarily charging said second set of electrodes;

first means for selecting one of said first set of electrodes and supplying a write voltage to said one of said first set of electrodes; and second circuit means for selecting one of said second set of electrodes and supplying a modulated voltage to said one of said second set of electrodes, said second circuit means including, pulse generating means for energizing said second set of electrodes with a voltage pulse, and pulse-modulation means for changing a predetermined parameter of the voltage pulse in accordance with said received video signal thereby supplying said modulated voltage to said second set of electrodes.

20. A video display device in accordance with claim 19 wherein said pulse-modulation means comprises:

means for smapling said received video signal thereby providing a plurality of sampled video information signals;

a plurality of storage means corresponding to each of said plurality of a second set of electrodes for storing each of said plurality of sampled video information signals therein, each of said plurality of sampled video information signals being stored in a corresponding one of said plurality of storage means, and pulse generating means connected to each of said second set of electrodes for energizing each of said plurality of a second set of electrodes with a voltage pulse, each of said plurality of sampled video information signals stored in said storage means modulating said voltage pulse when said voltage pulse energizes said second set of electrodes, the modulated voltage pulse energizing said second set of electrodes.

21. A video display device in accordance with claim 20 wherein each of said sampled video information signals amplitude modulates said voltage pulse when said voltage pulse energizes said second set of electrodes.

22. A video display devivce in accordance with claim 20 wherein each of said sampled video information signals pulse-width modulates said voltage pulse when said voltage pulse energizes said second set of electrodes.

* * * * *